United States Patent
Conor

(10) Patent No.: US 12,206,772 B1
(45) Date of Patent: *Jan. 21, 2025

(54) CRACKING PRIVATE KEY OF ASYMMETRIC CRYPTOSYSTEM

(71) Applicant: Raine Conor Research, LLC, Rancho Cucamonga, CA (US)

(72) Inventor: Raine Conor, Rancho Cucamonga, CA (US)

(73) Assignee: RAINE CONOR RESEARCH, LLC, Rancho Cucamonga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,036

(22) Filed: Aug. 9, 2023

Related U.S. Application Data

(63) Continuation of application No. 17/828,355, filed on May 31, 2022, now Pat. No. 11,764,955, which is a continuation of application No. 16/879,423, filed on May 20, 2020, now Pat. No. 11,456,863.

(60) Provisional application No. 62/854,278, filed on May 29, 2019.

(51) Int. Cl.
*H04L 9/40* (2022.01)
*G06F 7/72* (2006.01)
*H04L 9/08* (2006.01)
*H04L 9/30* (2006.01)

(52) U.S. Cl.
CPC ............ *H04L 9/0861* (2013.01); *G06F 7/72* (2013.01); *H04L 9/0825* (2013.01); *H04L 9/302* (2013.01)

(58) Field of Classification Search
CPC ..... H04L 9/0861; H04L 9/0825; H04L 9/302; G06F 7/72
See application file for complete search history.

(56) References Cited

U.S. PATENT DOCUMENTS

| | | | |
|---|---|---|---|
| 11,456,863 B1 * | 9/2022 | Conor | H04L 9/0861 |
| 11,764,955 B1 * | 9/2023 | Conor | H04L 9/0861 380/28 |
| 2009/0150684 A1 * | 6/2009 | Chang | H04L 9/002 713/193 |
| 2020/0374113 A1 | 11/2020 | Noam et al. | |

OTHER PUBLICATIONS

Code Project/Rick Oden; Prime Number Determination Using Wheel Factorization; Feb. 2, 2009.

(Continued)

*Primary Examiner* — Thaddeus J Plecha
(74) *Attorney, Agent, or Firm* — Stetina Brunda Garred & Brucker

(57) ABSTRACT

A method of cracking a private key of an asymmetric cryptosystem includes extracting a modulus and a public key exponent from a public key, calculating the digital root of the modulus, deriving a set of candidate base pairs corresponding to the digital root and the last digit of the modulus, each of the candidate base pairs including a first candidate base and a second candidate base, iteratively testing values of a multiplier until a sum of one of the candidate bases with ninety times the multiplier is a factor of the modulus, and determining the private key using the public key exponent and the factor of the modulus. The method may further include decrypting an encrypted message using the private key.

20 Claims, 4 Drawing Sheets

(56) References Cited

OTHER PUBLICATIONS

Buchanan, "Everything You Wanted to Know About Integer Factorization, but Were Afraid to Ask", Aug. 2018, 12 pages.
Boneh et al., "An Attack on RSA Given a Small Fraction of the Private Key Bits", Oct. 1998, pp. 25-34.
Ambedkar et al., "An Efficient Method to Factorize the RSA Public Key Encryption", Jun. 2011, pp. 108-111.
Holt, "Cracking RSA with Various Factoring Algorithms", 2020, pp. 1-8 (Year: 2020).
Mavroeidis et al., "The Impact of Quantum Computing on Present Cryptography", 2018, pp. 1-10 (Year: 2018).

* cited by examiner

140

| Digital Root, Last Digit of Modulus n | Set of Candidate Base Pairs $(B_1, B_2)$ |
|---|---|
| 1, 1 | $(B_1, B_2)_1, (B_1, B_2)_2, ...$ |
| 1, 3 | $(B_1, B_2)_1, (B_1, B_2)_2, ...$ |
| 1, 7 | $(B_1, B_2)_1, (B_1, B_2)_2, ...$ |
| 1, 9 | $(B_1, B_2)_1, (B_1, B_2)_2, ...$ |
| 2, 1 | $(B_1, B_2)_1, (B_1, B_2)_2, ...$ |
| 2, 3 | $(B_1, B_2)_1, (B_1, B_2)_2, ...$ |
| 2, 7 | $(B_1, B_2)_1, (B_1, B_2)_2, ...$ |
| 2, 9 | $(B_1, B_2)_1, (B_1, B_2)_2, ...$ |
| 4, 1 | $(B_1, B_2)_1, (B_1, B_2)_2, ...$ |
| 4, 3 | $(B_1, B_2)_1, (B_1, B_2)_2, ...$ |
| 4, 7 | $(B_1, B_2)_1, (B_1, B_2)_2, ...$ |
| 4, 9 | $(B_1, B_2)_1, (B_1, B_2)_2, ...$ |
| 5, 1 | $(B_1, B_2)_1, (B_1, B_2)_2, ...$ |
| 5, 3 | $(B_1, B_2)_1, (B_1, B_2)_2, ...$ |
| 5, 7 | $(B_1, B_2)_1, (B_1, B_2)_2, ...$ |
| 5, 9 | $(B_1, B_2)_1, (B_1, B_2)_2, ...$ |
| 7, 1 | $(B_1, B_2)_1, (B_1, B_2)_2, ...$ |
| 7, 3 | $(B_1, B_2)_1, (B_1, B_2)_2, ...$ |
| 7, 7 | $(B_1, B_2)_1, (B_1, B_2)_2, ...$ |
| 7, 9 | $(B_1, B_2)_1, (B_1, B_2)_2, ...$ |
| 8, 1 | $(B_1, B_2)_1, (B_1, B_2)_2, ...$ |
| 8, 3 | $(B_1, B_2)_1, (B_1, B_2)_2, ...$ |
| 8, 7 | $(B_1, B_2)_1, (B_1, B_2)_2, ...$ |
| 8, 9 | $(B_1, B_2)_1, (B_1, B_2)_2, ...$ |

FIG. 2

CRACKING PRIVATE KEY OF ASYMMETRIC CRYPTOSYSTEM

CROSS-REFERENCE TO RELATED APPLICATIONS

This application is a continuation of U.S. patent application Ser. No. 17/828,355, filed May 31, 2022 and entitled "CRACKING PRIVATE KEY OF ASYMMETRIC CRYPTOSYSTEM," which is a continuation of U.S. patent application Ser. No. 16/879,423, filed May 20, 2020 and entitled "CRACKING PRIVATE KEY OF ASYMMETRIC CRYPTOSYSTEM," which relates to and claims the benefit of U.S. Provisional Application No. 62/854,278, filed May 29, 2019 and entitled "CRACKING PRIVATE KEY OF ASYMMETRIC CRYPTOSYSTEM," the entire contents of each of which is expressly incorporated herein by reference.

STATEMENT RE: FEDERALLY SPONSORED RESEARCH/DEVELOPMENT

Not Applicable

BACKGROUND

1. Technical Field

The present disclosure relates generally to cryptography and, more particularly, to cracking a private key of an asymmetric cryptosystem.

2. Related Art

In an asymmetric cryptosystem, a readily available "public key" is derived from a secret "private key." Using the public key, a person can send an encrypted message to the owner of the private key, who can then use the private key to decrypt the message. The private key may also be used to encrypt a message, which can then be decrypted using the public key to authenticate the identity of the sender as being the owner of the private key.

In principle, asymmetric encryption relies on the computational difficulty of determining the private key from the public key. As such, existing systems for determining a private key from a public key, i.e. "cracking" the private key, must resort to using impractical brute force methods of guessing the private key. Such methods require vast amounts of computing resources and/or time.

BRIEF SUMMARY

The present disclosure contemplates various systems, methods, and apparatuses for overcoming the above drawbacks accompanying the related art. One aspect of the embodiments of the present disclosure is a non-transitory program storage medium on which are stored instructions executable by a processor or programmable circuit to perform operations for cracking a private key of an asymmetric cryptosystem. The operations may include extracting a modulus and a public key exponent from a public key, calculating the digital root of the modulus, deriving a set of candidate base pairs corresponding to the digital root and the last digit of the modulus, each of the candidate base pairs including a first candidate base and a second candidate base, iteratively testing values of a multiplier until a sum of one of the candidate bases with ninety times the multiplier is a factor of the modulus, and determining the private key using the public key exponent and the factor of the modulus.

Extracting the modulus and the public key exponent from the public key may include parsing an encoded data structure containing the public key. The parsing may be performed using an ASN.1 parser.

Deriving the set of candidate base pairs may include referencing one or more lookup tables associating possible combinations of the digital root and the last digit of the modulus with possible candidate base pairs.

Iteratively testing values of the multiplier may include incrementing an integer t and testing, for each of the candidate base pairs, the sum of the second candidate base with ninety times the multiplier p, the multiplier p being equal to the expression $$\frac{\pm\sqrt{(B_1 + B_2 + 90(t_{0+}t))^2 - 4n} + B_1 - B_2 + 90(t_{0+}t)}{180},$$

where n is the modulus, $B_1$ is the first candidate base, $B_2$ is the second candidate base, and to is a starting value offset. The starting value offset $t_0$ may be a function of the modulus n. The starting value offset $t_0$ may be approximately equal to twice the square root of the modulus divided by ninety. The starting value offset to may be equal to the expression $$\frac{2\sqrt{n} - B_1 - B_2}{90}.$$

The starting value offset to may be equal to the expression $$\frac{\sqrt{d^2 + 4n} - B_1 - B_2}{90},$$

where d is a minimum difference between factors of the modulus n.

Iteratively testing values of the multiplier may include checking whether the multiplier p is an integer.

Iteratively testing values of the multiplier may include checking whether the expression $(B_1+B_2+90(t_0+t))^2-4n$ is a perfect square.

Iteratively testing values of the multiplier may include, for each of the candidate base pairs, comparing the modulus n to the product of the candidate base pair $B_1*B_2$. The comparing may include checking whether the second-to-last digit of the modulus n and the second-to-last digit of the product $B_1*B_2$ have the same parity. Iteratively testing may include, for each of the candidate base pairs, checking whether the sum of the candidate base pair $B_1+B_2$ is divisible by 4.

Determining the private key may include determining a private key exponent of the private key such that the product of the private key exponent and the public key exponent is congruent to one modulo $\varphi$, where $\varphi$ is equal to (F1−1)* (F2−1), F2 is the factor of the modulus, and F1 is a value equal to the modulus divided by F2.

The operations may further include decrypting an encrypted message using the private key. Decrypting the encrypted message may include decrypting an encrypted symmetric key using the private key and decrypting the message using the symmetric key. Decrypting the encrypted message may include parsing an encoded data structure including the encrypted message. The parsing may be performed using an ASN.1 parser. Decrypting the encrypted message may include determining a plaintext m such that a ciphertext c of the encrypted message raised to the power of the private key exponent is congruent to m modulo n.

Another aspect of the embodiments of the present disclosure is a method of cracking a private key of an asymmetric cryptosystem. The method may include extracting a modulus and a public key exponent from a public key, calculating the digital root of the modulus, deriving a set of candidate base pairs corresponding to the digital root and the last digit of the modulus, each of the candidate base pairs including a first candidate base and a second candidate base, iteratively testing values of a multiplier until a sum of one of the candidate bases with ninety times the multiplier is a factor of the modulus, and determining the private key using the public key exponent and the factor of the modulus.

The method may further include decrypting an encrypted message using the private key.

Another aspect of the embodiments of the present disclosure is a system for cracking a private key of an asymmetric cryptosystem. The system may include an n/e extractor for extracting a modulus ("n") and a public key exponent ("e") from a public key, a digital root calculator for calculating the digital root of the modulus, a candidate base pair deriving engine for deriving a set of candidate base pairs corresponding to the digital root and the last digit of the modulus, each of the candidate base pairs including a first candidate base and a second candidate base, an iterator for iteratively testing values of a multiplier until a sum of one of the candidate bases with ninety times the multiplier is a factor of the modulus, and a private key determiner for determining the private key using the public key exponent and the factor of the modulus.

The system may further include a decryptor for decrypting an encrypted message using the private key.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 shows an example data structure for deriving a set of candidate base pairs for a given modulus n;

DETAILED DESCRIPTION

The present disclosure encompasses various embodiments of systems, methods, and apparatuses for cracking a private key of an asymmetric cryptosystem. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
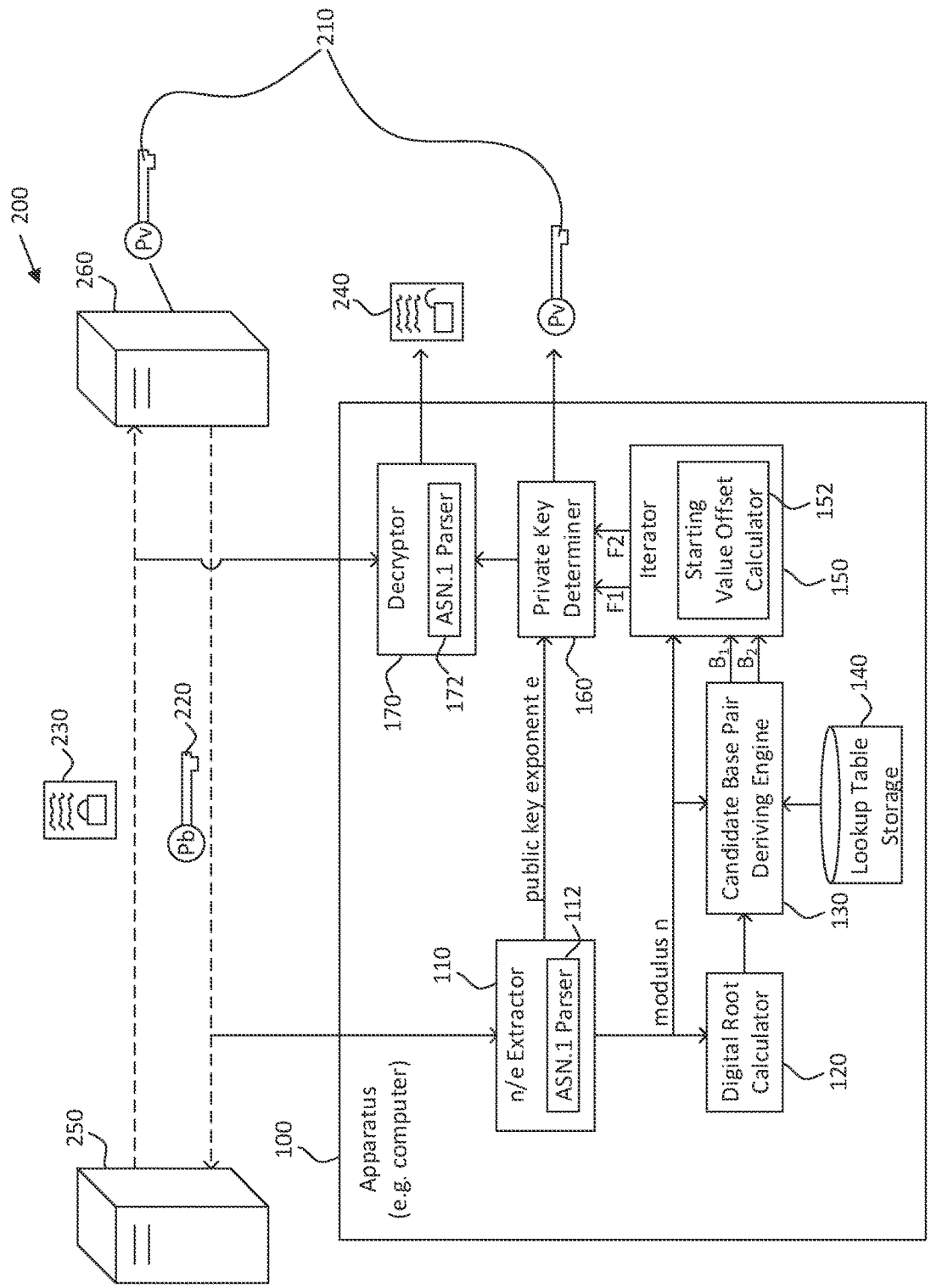
FIG. 1 shows an apparatus for cracking a private key of an asymmetric cryptosystem according to an embodiment of the present disclosure.

FIG. 1 shows an example apparatus 100 for cracking a private key 210 of an asymmetric cryptosystem 200 according to an embodiment of the present disclosure. The apparatus 100 may determine the private key 210 from a public key 220 associated with the private key 210. A user of the apparatus 100 further wishing to decrypt an encrypted message 230 that was encrypted using the public key 220 may then use the private key 210 to decrypt the encrypted message 230, thus producing a decrypted message 240. In the example of FIG. 1, a sender system 250 operated by a person wishing to send an encrypted message 230 receives the public key 220 of the intended recipient from a recipient system 260. The public key 220 may, for example, be published and thus obtainable indirectly from the recipient system 260. Only the recipient system 260 has access to the private key 210. Using only the readily obtainable public key 220, the apparatus 100 may determine the private key 210. The apparatus 100 may include an n/e extractor 110, a digital root calculator 120, a candidate base pair deriving engine 130, a lookup table storage 140, an iterator 150, a private key determiner 160, and a decryptor 170.

The n/e extractor 110 may extract one or more components of the public key 220 for use by the apparatus 100. For example, in the context of the RSA (Rivest-Shamir-Adleman) cryptosystem, a public key 220 may include a modulus n and a public key exponent e that are encoded in an encoded data structure as defined according to an RSA Laboratories' Public Key Cryptography Standard (PKCS), e.g. PKCS #1 version 2.2 (see RFC 8017, the entire contents of which is incorporated herein by reference), or other asymmetric cryptosystem standard. The n/e extractor 110 may extract the modulus n and the public key exponent e from the public key 220, for example, by parsing the encoded data structure representing the public key 110 using an ASN.1 parser 112. As part of the process of determining the private key 210, the apparatus 100 may factor the modulus n into prime factors F1 and F2 as described in more detail below.

The digital root calculator 120 may calculate the digital root of the modulus n. The digital root of a number is the single digit number arrived at by summing the digits of the original number and iteratively summing the digits of the result. The digital root calculator 120 may calculate the digital root of the modulus n by such iterative summing or, for example, by evaluating the expression $1+(n-1)$ modulo 9. For example, if n equals 159, the digital root of n may be calculated, for example, iteratively as $159 \rightarrow 1+5+9 \rightarrow 15 \rightarrow 1+5 \rightarrow 6$ or be evaluating $1+(159-1)$ modulo $9=1+158$ modulo $9=1+5=6$. By calculating the digital root of the modulus n, the apparatus 100 may deduce the possible combinations of digital roots for prime factors F1 and F2 according to the following table:

TABLE 1

| Digital root of n | Possible digital roots of F1, F2 | | | |
|---|---|---|---|---|
| 1 | 1, 1 | 2, 5 | 4, 7 | 8, 8 |
| 2 | 1, 2 | 4, 5 | 7, 8 | |
| 4 | 1, 4 | 2, 2 | 5, 8 | 7, 7 |

TABLE 1-continued

| Digital root of n | Possible digital roots of F1, F2 | | | |
|---|---|---|---|---|
| 5 | 1, 5 | 2, 7 | 4, 8 | |
| 7 | 1, 7 | 2, 8 | 4, 4 | 5, 5 |
| 8 | 1, 8 | 2, 4 | 5, 7 | |

For example, if the digital root of the modulus n is 2, then the digital roots of F1 and F2 must be either 1 and 2, 4 and 5, or 7 and 8. This is because the digital root of a product of two numbers is always the same as the digital root of the product of the digital roots of the two numbers. Since 1 and 2, 4 and 5, and 7 and 8 are the only pairs of single digit numbers whose product has a digital root of 2, one of these pairs of numbers must represent the digital roots of F1 and F2.

With the possible digital roots of the factors F1 and F2 known from the above Table 1, the possible values of the factors F1 and F2 are narrowed down accordingly. We can ignore cases where the digital root of n is 3, 6, or 9 because a number whose digital root is divisible by 3 is itself divisible by 3. Therefore, once it is known that the digital root of n is 3, 6, or 9, the factors F1 and F2 are immediately known to be F1=3 and F2=n/3, resulting in a trivial case that is not a realistic modulus n of a public key.

Similarly, from the last digit of the modulus n, the apparatus 100 may deduce the possible combinations of last digits for prime factors F1 and F2 according to the following table:

TABLE 2

| Last digit of n | Possible last digits of F1, F2 | | | |
|---|---|---|---|---|
| 1 | 1, 1 | 3, 7 | 9, 9 | |
| 3 | 1, 3 | 7, 9 | | |
| 7 | 1, 7 | 3, 9 | | |
| 9 | 1, 9 | 3, 3 | 7, 7 | |

For example, if the last digit of the modulus n is 3, then the last digits of F1 and F2 must be either 1 and 3 or 7 and 9. This is because these are the only pairs of single digit numbers whose product has a last digit of 3.

With the possible last digits of the factors F1 and F2 known from the above Table 2, the possible values of the factors F1 and F2 are further narrowed down accordingly. We can ignore cases where the last digit of the modulus n is an even number because a number whose last digit is an even number is itself divisible by 2. Therefore, once it is known that the last digit of the modulus n is an even number, the factors F1 and F2 are immediately known to be F1=2 and F2=n/2, resulting in another trivial case. Likewise, we can ignore cases where the last digit of the modulus n is 5 because a number whose last digit is 5 is itself divisible by 5. Therefore, once it is known that the last digit of the modulus n is 5, the factors F1 and F2 are immediately known to be F1=5 and F2=n/5, resulting in yet another trivial case.

As illustrated above, knowledge of the digital root and last digit of the modulus n can narrow down the possible values of the prime factors F1 and F2 of the modulus n. As an example, consider a hypothetical semiprime modulus n=810143, having a digital root of 8 as determined by the digital root calculator 120 and a last digit of 3. Consulting Tables 1 and 2, it can be seen that the possible digital roots of the prime factors F1, F2 are (1, 8), (2, 4), and (5, 7) and that the possible last digits of the prime factors F1, F2 are (1, 3) and (7, 9). Combining these two pieces of information, it can be deduced that the prime factors F1, F2 must match one of the twelve possibilities listed in Table 3 below:

TABLE 3

Example 1: n = 810143; digital root = 8; last digit = 3

| | F1 | | F2 | |
|---|---|---|---|---|
| Possibility # | Digital root | Last digit | Digital root | Last digit |
| 1 | 1 | 1 | 8 | 3 |
| 2 | 1 | 3 | 8 | 1 |
| 3 | 1 | 7 | 8 | 9 |
| 4 | 1 | 9 | 8 | 7 |
| 5 | 2 | 1 | 4 | 3 |
| 6 | 2 | 3 | 4 | 1 |
| 7 | 2 | 7 | 4 | 9 |
| 8 | 2 | 9 | 4 | 7 |
| 9 | 5 | 1 | 7 | 3 |
| 10 | 5 | 3 | 7 | 1 |
| 11 | 5 | 7 | 7 | 9 |
| 12 | 5 | 9 | 7 | 7 |

The candidate base pair deriving engine 130 may derive a set of candidate base pairs corresponding to the digital root and the last digit of the modulus n, each of the candidate base pairs including a first candidate base $B_1$ and a second candidate base $B_2$. The bases $B_1$, $B_2$ are typically small numbers from which the prime factors F1, F2, respectively, can be generated by adding multiples of ninety. For example, the bases $B_1$, $B_2$ may be defined such that $F1=B_1+90x_1$ and $F2=B_2+90x_2$, where $x_1$ and $x_2$ are non-negative integers. Because both the digital root and the last digit of a number are invariant to adding multiples of ninety, the bases $B_1$, $B_2$ have the same digital root and last digit as the factors F1, F2 generated therefrom. Thus, given the set of possibilities shown in Table 3, a unique set of candidate bases can be derived having the same combinations of digital root and last digit. That is, each of the possibilities 1-12 in Table 3 yields a unique candidate base pair, one of which will be the correct base pair $B_1$, $B_2$ for generating the factors F1, F2.

Table 4 shows an example of a complete set of bases whose digital roots and last digits cover every possible combination of interest, i.e. digital roots 1, 2, 4, 5, 7, 8 and last digits 1, 3, 7, 9:

TABLE 4

| Base | Digital root | Last digit |
|---|---|---|
| 01 | 1 | 1 |
| 73 | 1 | 3 |
| 37 | 1 | 7 |
| 19 | 1 | 9 |
| 11 | 2 | 1 |
| 83 | 2 | 3 |
| 47 | 2 | 7 |
| 29 | 2 | 9 |
| 31 | 4 | 1 |
| 13 | 4 | 3 |
| 67 | 4 | 7 |
| 49 | 4 | 9 |
| 41 | 5 | 1 |
| 23 | 5 | 3 |
| 77 | 5 | 7 |
| 59 | 5 | 9 |
| 61 | 7 | 1 |
| 43 | 7 | 3 |
| 07 | 7 | 7 |
| 79 | 7 | 9 |
| 71 | 8 | 1 |
| 53 | 8 | 3 |

TABLE 4-continued

| Base | Digital root | Last digit |
|------|--------------|------------|
| 17   | 8            | 7          |
| 89   | 8            | 9          |

Using the example set of bases of Table 4 and continuing with the above specific example of Table 3 (n=810143; digital root=8; last digit=3), each of the possibilities 1-12 yields a unique candidate base pair ($B_1$, $B_2$) as shown below in Table 5, which is an expanded version of Table 3:

TABLE 5

Example 1: n = 810143; digital root = 8; last digit = 3

| Possibility # | F1 | | | F2 | | |
|---|---|---|---|---|---|---|
| | Digital root | Last digit | $B_1$ | Digital root | Last digit | $B_2$ |
| 1  | 1 | 1 | 01 | 8 | 3 | 53 |
| 2  | 1 | 3 | 73 | 8 | 1 | 71 |
| 3  | 1 | 7 | 37 | 8 | 9 | 89 |
| 4  | 1 | 9 | 19 | 8 | 7 | 17 |
| 5  | 2 | 1 | 11 | 4 | 3 | 13 |
| 6  | 2 | 3 | 83 | 4 | 1 | 31 |
| 7  | 2 | 7 | 47 | 4 | 9 | 49 |
| 8  | 2 | 9 | 29 | 4 | 7 | 67 |
| 9  | 5 | 1 | 41 | 7 | 3 | 43 |
| 10 | 5 | 3 | 23 | 7 | 1 | 61 |
| 11 | 5 | 7 | 77 | 7 | 9 | 79 |
| 12 | 5 | 9 | 59 | 7 | 7 | 07 |

As shown above, in the example of n=810143, the candidate base pair deriving engine 130 may derive the following set of twelve candidate base pairs ($B_1$, $B_2$): (01, 53), (73, 71), (37, 89), (19, 17), (11, 13), (83, 31), (47, 49), (29, 67), (41, 43), (23, 61), (77, 79), and (59, 07). The candidate base pair deriving engine 130 may, for example, reference one or more lookup tables associating possible combinations of the digital root and the last digit of the modulus n with possible candidate base pairs $B_1$, $B_2$.

The iterator 150 may iteratively test values of a multiplier until a sum of one of the candidate bases with ninety times the multiplier is a factor of the modulus n. In particular, as explained above, the bases $B_1$ and $B_2$ may be defined such that $F1=B_1+90x_1$ and $F2=B_2+90x_2$, where $x_1$ and $x_2$ are non-negative integers. Transforming these expressions so that the factors F1 and F2 depend on the sum of $x_1$ and $x_2$, e.g. defining $t=x_1+x_2$ and $p=x_2$, we can express the same factors F1 and F2 as $F1=B_1+90(t-p)$ and $F2=B_2+90p$. Relating these two equations by the known value of the modulus n, we see that $$n = F1 * F2$$
$$n = (B_1 + 90(t - p)) * (B_2 + 90p)$$
$$n = -8100p^2 + 90pB_1 - 90pB_2 + 8100pt + 90tB_2 + B_1B_2$$
$$n = -8100\left(p - \frac{B_1 - B_2 + 90t}{180}\right)^2 + \frac{(B_1 + B_2 + 90t)^2}{4},$$

which is the equation for a parabola in vertex form on a Cartesian coordinate system with the X-axis denoting p values and the Y-axis denoting values of the modulus n. Namely, the above equation defines the parabola $$n = -8100(p-h)^2 + k$$

whose vertex is at $$(h, k) = \left(\frac{B_1 - B_2 + 90t}{180}, \frac{(B_1 + B_2 + 90t)^2}{4}\right).$$

Isolating p by the quadratic formula or from the above equation for n in vertex form, we see that $$p = \frac{\pm\sqrt{(B_1 + B_2 + 90t)^2 - 4n} + B_1 - B_2 + 90t}{180}.$$

Using the above equation for p, the iterator 150 may iterate values of t and test each resulting p to check if the resulting $B_2+90p$ is indeed a factor of n. For example, the iterator 150 may check whether n modulo ($B_2+90p$)=0, thus yielding the factor $F2=B_2+90p$. The iterator 150 may then determine the other factor F1 by dividing the modulus n by the known factor F2 or by solving the expression $F1=B_1+90(t-p)$ using the t and p values that resulted in the factor F2.

It is noted that p itself must be a positive integer in order for $B_2+90p$ to be a factor of n. Therefore, the iterator 150 need not check whether n modulo ($B_2+90p$)=0 for values of p that are not positive integers. In this way, the iterator 150 may reduce the amount of time and/or processing resources spent. For example, at each iteration of t, the iterator 150 may, upon calculating p, first check whether p is an integer. If p is not an integer, the iterator 150 may skip to the next iteration without checking whether n modulo (B2+90p)=0. Depending on the size of the modulus n, there may be a tradeoff between processor resources required to test whether p is an integer and processor resources wasted checking whether n modulo (B2+90p)=0 for a non-integer p. The precision with which the iterator 150 checks whether p is an integer may thus be selected to optimize performance. In this regard, it is contemplated that it may be optimal in some cases not to check whether p is an integer and to simply proceed with checking whether n modulo (B2+90p)=0 for every iteration. It is further contemplated that the value of p may be floored or otherwise rounded to the nearest integer. In this case, additional optimization can be achieved by keeping track of which values of rounded p have already been tested and skipping iterations that result in the same value of rounded p.

As explained above, the equation for p may be derived as a function of t, where t is a function of both $x_1$ and $x_2$, e.g. $t=x_1+x_2$. In other words, the derived value p may serve as the multiplier whose values are iteratively tested by the iterator 150. By virtue of this transformation, it is possible to greatly reduce the number of iterations that need to be checked by the iterator 150. To illustrate this, consider an alternative derivation where $F1=B_1+90x_1$ and $F2=B_2+90x_2$ are used directly, for example, by iterating $x_1$ or $x_2$ and checking whether n modulo ($B_1+90x_1$)=0 or n modulo ($B_2+90x_2$)=0. In this case, $x_1$ or $x_2$ may serve as the multiplier whose values are iteratively tested by the iterator 150. When using such a method, it is possible for the correct factorization F1, F2 to result when one or the other of $x_1$ and $x_2$ is very small, even equal to 0 or 1, even in the case of a very large modulus n. That is, one of $x_1$ and $x_2$ might be very small while the other is very large. As a result, when iterating $x_1$ or $x_2$, it must be recognized that every possible value of $x_1$ (or every possible value of $x_2$) may potentially yield a factor of the modulus n. Under such circumstances, it is difficult to reduce the number of iterations that need to be tested without knowing special information about the factors F1 and F2.

In contrast, the above equation for p is derived in terms of t, which is itself a function of both $x_1$ and $x_2$, e.g. $t=x_1+x_2$. Thus, when the modulus n is very large, t cannot possibly be very small, since small t would mean that both $x_1$ and $x_2$ are small, which can never result in large n. That is, considering $F1=B_1+90x_1$ and $F2=B_2+90x_2$ for a given candidate base pair $B_1$, $B_2$, the value $t=x_1+x_2$ cannot be small unless F1*F2 (i.e. the modulus n) is itself small. When testing the candidate base pair (01, 53), for example, a small value such as $t=6$ would yield potential pairs of F1 and F2 that are far too small to be factors of our hypothetical modulus n=810143, as shown below in Table 6:

TABLE 6

| t = 6 | F1 = 1 + 90$x_1$ | F2 = 53 + 90$x_2$ | n = F1 * F2 |
|---|---|---|---|
| $x_1$ = 0  $x_2$ = 6 | F1 = 1 | F2 = 593 | n = 593 |
| $x_1$ = 1  $x_2$ = 5 | F1 = 91 | F2 = 503 | n = 45773 |
| $x_1$ = 2  $x_2$ = 4 | F1 = 181 | F2 = 413 | n = 74753 |
| $x_1$ = 3  $x_2$ = 3 | F1 = 271 | F2 = 323 | n = 87533 |
| $x_1$ = 4  $x_2$ = 2 | F1 = 361 | F2 = 233 | n = 84113 |
| $x_1$ = 5  $x_2$ = 1 | F1 = 451 | F2 = 143 | n = 64493 |
| $x_1$ = 6  $x_2$ = 0 | F1 = 541 | F2 = 53 | n = 28673 |

As shown in Table 6, for the given modulus n=810143 and base pair (01, 53), it is unnecessary to check any pairs of $x_1$ and $x_2$ for which $t \le 6$. Such a constraint can greatly reduce the number of iterations.

An example of how this constraint can be applied more generally is easily demonstrated from the above equation for p, where it can readily be seen that the expression under the square root must be equal to or greater than 0 for any real values of p. Setting this expression equal to 0, a lower bound $t_0$ can thus be derived as follows:

$$(B_1 + B_2 + 90t_0)^2 - 4n = 0$$

$$4n = (B_1 + B_2 + 90t_0)^2$$

$$\sqrt{4n} = B_1 + B_2 + 90t_0$$

$$t_0 = \frac{2\sqrt{n} - B_1 - B_2}{90}$$

Thus, for example, for the given modulus n=810143 and base pair (01, 53), it can be seen that it is unnecessary to test values of $t \le 20$. Because values below $t=t_0$ cannot result in real values of p and thus cannot possibly yield factors F1, F2 of the modulus n, the iterator 150 may begin iterating at $t=t_0$, which may be rounded up to the nearest integer value. As expected, the lower bound $t_0$ increases in proportion to the size of the modulus n. The above equation for p can thus be generalized to include a starting value offset to equal to the lower bound to derived above, thus:

$$p = \frac{\pm\sqrt{(B_1 + B_2 + 90(t_0+t))^2 - 4n} + B_1 - B_2 + 90(t_0+t)}{180}.$$

To this end, the iterator 150 may include a starting value offset calculator 152 that calculates a starting value offset to as a function of the modulus n. The starting value offset calculator 152 may, for example, calculate the starting value offset $t_0$ to be equal to $(2\sqrt{n}-B_1-B_2)/90$ as derived above. It is also contemplated, however, that the starting value offset calculator 152 may instead calculate an approximate starting value offset $t_0$ that does not depend on $B_1$ and $B_2$, which may be known to be small. For example, the starting value offset calculator 152 may more generally calculate the starting value offset $t_0$ to be approximately equal to $2\sqrt{n}/90$, for example, $t_0=2\sqrt{n}/90-2$ to account for all possible values of $-(B_1-B_2)/90$ using the set of bases of the above examples.

Continuing with the above example of n=810143 and using the above approximation for the starting value offset $t_0=2\sqrt{n}/90-2$, we can begin iterating at values near $t_0=19$ as shown below for each possible candidate base pair ($B_1$, $B_2$) shown in Table 5:

TABLE 7

| | Example 1: n = 810143 | | $t_0 = (2\sqrt{n})/90 - 2 = 18.002 \to 19$ | |
|---|---|---|---|---|
| t | ($B_1$, $B_2$) | $p = \frac{\pm\sqrt{(B_1 + B_2 + 90(t_0+t))^2 - 4n} + B_1 - B_2 + 90(t_0+t)}{180}$ | | n modulo ($B_2$ + 90p) |
| 0 | (01, 53) | UNDEFINED | UNDEFINED | — (non-integer p) |
| 0 | (73, 71) | 11.97532 | 7.046898 | — |
| 0 | (37, 89) | 11.21669 | 7.205532 | — |
| 0 | (19, 17) | UNDEFINED | UNDEFINED | — |
| 0 | (11, 13) | UNDEFINED | UNDEFINED | — |
| 0 | (83, 31) | 11.42192 | 8.155858 | — |
| 0 | (47, 49) | 10.29519 | 8.682587 | — |
| 0 | (29, 67) | 10.09519 | 8.482587 | — |
| 0 | (41, 43) | UNDEFINED | UNDEFINED | — |
| 0 | (23, 61) | UNDEFINED | UNDEFINED | — |
| 0 | (77, 79) | 12.21838 | 6.759397 | — |
| 0 | (59, 07) | UNDEFINED | UNDEFINED | — |
| 1 | (01, 53) | 12.17532 | 7.246898 | — |
| 1 | (73, 71) | 14.08816 | 5.93406 | — |
| 1 | (37, 89) | 13.51536 | 5.906857 | — |
| 1 | (19, 17) | 12.01669 | 8.005532 | — |
| 1 | (11, 13) | 11.62192 | 8.355858 | — |
| 1 | (83, 31) | 13.90138 | 6.676393 | — |
| 1 | (47, 49) | 13.29547 | 6.682311 | — |
| 1 | (29, 67) | 13.09547 | 6.482311 | — |
| 1 | (41, 43) | 13.07652 | 6.901259 | — |
| 1 | (23, 61) | 12.87652 | 6.701259 | — |
| 1 | (77, 79) | 14.23939 | 5.738384 | — |
| 1 | (59, 07) | 13.01838 | 7.559397 | — |

TABLE 7-continued

Example 1: n = 810143   $t_0 = (2\sqrt{n})/90 - 2 = 18.002 \rightarrow 19$

| t | $(B_1, B_2)$ | $p = \dfrac{\pm\sqrt{(B_1 + B_2 + 90(t_0 + t))^2 - 4n} + B_1 - B_2 + 90(t_0 + t)}{180}$ | | n modulo $(B_2 + 90p)$ |
|---|---|---|---|---|
| 2 | (01, 53) | 14.28816 | 6.13406 | — |
| 2 | (73, 71) | 15.77156 | 5.25066 | — |
| 2 | (37, 89) | 15.25317 | 5.169053 | — |
| 2 | (19, 17) | 14.31536 | 6.706857 | — |
| 2 | (11, 13) | 14.10138 | 6.876393 | — |
| 2 | (83, 31) | 15.68107 | 5.896706 | — |
| 2 | (47, 49) | 15.14902 | 5.828761 | — |
| 2 | (29, 67) | 14.94902 | 5.628761 | — |
| 2 | (41, 43) | 14.9889 | 5.988875 | — |
| 2 | (23, 61) | 14.7889 | 5.788875 | — |
| 2 | (77, 79) | 15.89106 | 5.086717 | — |
| 2 | (59, 07) | 15.03939 | 6.538384 | — |
| 3 | (01, 53) | 15.97156 | 5.45066 | — |
| 3 | (73, 71) | 17.27389 | 4.748337 | — |
| 3 | (37, 89) | 16.78337 | 4.638851 | — |
| 3 | (19, 17) | 16.05317 | 5.969053 | — |
| 3 | (11, 13) | 15.88107 | 6.096706 | — |
| 3 | (83, 31) | 17.23168 | 5.346096 | — |
| 3 | (47, 49) | 16.73346 | 5.244315 | — |
| 3 | (29, 67) | 16.53346 | 5.044315 | — |
| 3 | (41, 43) | 16.59842 | 5.379362 | — |
| 3 | (23, 61) | 16.39842 | 5.179362 | — |
| 3 | (77, 79) | 17.37639 | 4.601391 | — |
| 3 | (59, 07) | 16.69106 | 5.886717 | — |
| 4 | (01, 53) | 17.47389 | 4.948337 | — |
| 4 | (73, 71) | 18.67158 | 4.35064 | — |
| 4 | (37, 89) | 18.19841 | 4.223812 | — |
| 4 | (19, 17) | 17.58337 | 5.438851 | — |
| 4 | (11, 13) | 17.43168 | 5.546096 | — |
| 4 | (83, 31) | 18.65912 | 4.918654 | — |
| 4 | (47, 49) | 18.18093 | 4.796845 | — |
| 4 | (29, 67) | 17.98093 | 4.596845 | — |
| 4 | (41, 43) | 18.0603 | 4.917477 | — |
| 4 | (23, 61) | 17.8603 | 4.717477 | — |
| 4 | (77, 79) | 18.76328 | 4.214496 | — |
| 4 | (59, 07) | 18.17639 | 5.401391 | — |
| 5 | (01, 53) | 18.87158 | 4.55064 | — |
| 5 | (73, 71) | 20 | 4.022222 | 0 (p = 20) |

There may be a handful of "UNDEFINED" values of p in the early iterations. This is to be expected due to the use of an approximation for the starting value offset $t_0 = 2\sqrt{n}/90 - 2$. In the above example, the approximate starting value offset to turns out to be too low for six of the twelve candidate base pairs, resulting in a negative square root when calculating p.

As shown above, on the sixty-second iteration, i.e. t=5 for candidate base pair (73,71), the iterator 150 may arrive at p=20, an integer value, and may check whether n modulo (B2+90p)=0. Since n modulo (B2+90p)=0 for p=20, the iterator 150 may conclude that p yields the correct factors of the modulus n. The iterator 150 may then determine the factor $F2 = B_2 + 90p = 71 + 90*20 = 1871$ and the other factor F1=433.

Under certain circumstances, additional information may be known about the factors F1 and F2. For example, an RSA cryptosystem may define certain constraints that must be adhered to. As an example, it may be known that the number of digits of each factor F1, F2 is equal to half the number of digits of the modulus n. More generally, it may be possible to assume some minimum difference d between the factors F1, F2, for example, a difference d having a number of digits that is also equal to half the number of digits of the modulus n. The starting value offset calculator 152 may apply such constraints when calculating the starting value offset to.

To apply a minimum difference d between the factors F1, F2, a difference D may first be defined as shown below:

$$D = F1 - F2$$

$$D = (B_1 + 90(t-p)) - (B_2 + 90p)$$

$$D = 90t - 180p + B_1 - B_2$$

The difference D may then be substituted in to the above equation for the modulus n, and we can solve for t in terms of the difference D:

$$n = -8100\left(p - \frac{B_1 - B_2 + 90t}{180}\right)^2 + \frac{(B_1 + B_2 + 90t)^2}{4} - \frac{4(B_1 + B_2 + 90t)^2}{4} =$$

$$4(-8100)\left(p - \frac{B_1 - B_2 + 90t}{180}\right)^2$$

$$(B_1 + B_2 + 90t)^2 - 4N = (180p - (B_1 - B_2 + 90t))^2$$

$$(B_1 + B_2 + 90t)^2 - 4N = (90t - 180p + B_1 - B_2)^2$$

$$(B_1 + B_2 + 90t)^2 - 4N = (D)^2$$

$$t = \frac{\sqrt{D^2 + 4n} - B_1 - B_2}{90}$$

Observing that the value of t increases as the difference D increases, we can substitute in our chosen minimum difference d and use the resulting t as a minimum value of t. Thus, we can generalize the above-derived equation for the starting value offset $t_0$ as shown below:

$$t_0 = \frac{\sqrt{d^2 + 4n} - B_1 - B_2}{90},$$

which simplifies to the previous equation for the starting value offset to in a case where d=0, i.e. when there is no mandated minimum difference d between the factors F1, F2.

It is also contemplated that the number of iterations can be further reduced by skipping half the values of t for a given candidate base pair $(B_1, B_2)$ based on a comparison of the modulus n to the product of the candidate base pair $B_1*B_2$. For example, it has been found that when the second-to-last digit of the modulus n has the same parity (i.e. even/oddness) as the second-to-last digit of the product of the candidate base pair $B_1*B_2$, then the value of $t_0+t$ that yields the factorization will necessarily be even. If not, then the value of $t_0+t$ that yields the factorization will necessarily be odd. Therefore, when incrementing t, it is only necessary to test the even or odd values of t for each candidate base pair $(B_1, B_2)$, but not both. An example of this is shown in Table 8 below, which is a modified version of Table 7:

can be easily checked, for example, by evaluating n mod 20 or $(B_1*B_2)$ mod 20, which yields a single digit number when the second-to-last digit is even and a two-digit number when the second-to-last digit is odd. It should be noted that, because the products $B_1*B_2$ all have the same last digit as the modulus n, the values n mod 20 and $(B_1*B_2)$ mod 20 will themselves be equal whenever their parity is the same. Therefore, it may be equivalently evaluated whether n mod 20 equals $(B_1*B_2)$ mod 20. If so, then only even values of $t_0+t$ need be evaluated. If not, then only odd values of $t_0+t$ need be evaluated.

Along the same lines, it is contemplated that the number of iterations can be further reduced according to the following rules:

Case 1

In the case of a candidate base pair $(B_1, B_2)$ for which n mod 20 equals $(B_1*B_2)$ mod 20, or equivalently where n mod 20 has the same parity as $(B_1*B_2)$ mod 20, it is only

TABLE 8

Example 1: n = 810143 (even)  $t_0 = (2\sqrt{n})/90 - 2 = 18.002 \to 19$

| t | $(B_1, B_2)$ | $p = \frac{\pm\sqrt{(B_1 + B_2 + 90(t_0 + t))^2 - 4n} + B_1 - B_2 + 90(t_0 + t)}{180}$ | | n modulo $(B_2 + 90p)$ |
|---|---|---|---|---|
| 0 | (01, 53) | UNDEFINED | UNDEFINED | — (non-integer p) |
| 0 | (37, 89) | 11.21669 | 7.205532 | — |
| 0 | (83, 31) | 11.42192 | 8.155858 | — |
| 0 | (59, 07) | UNDEFINED | UNDEFINED | — |
| 1 | (73, 71) | 14.08816 | 5.93406 | — |
| 1 | (19, 17) | 12.01669 | 8.005532 | — |
| 1 | (11, 13) | 11.62192 | 8.355858 | — |
| 1 | (47, 49) | 13.29547 | 6.682311 | — |
| 1 | (29, 67) | 13.09547 | 6.482311 | — |
| 1 | (41, 43) | 13.07652 | 6.901259 | — |
| 1 | (23, 61) | 12.87652 | 6.701259 | — |
| 1 | (77, 79) | 14.23939 | 5.738384 | — |
| 2 | (01, 53) | 14.28816 | 6.13406 | — |
| 2 | (37, 89) | 15.25317 | 5.169053 | — |
| 2 | (83, 31) | 15.68107 | 5.896706 | — |
| 2 | (59, 07) | 15.03939 | 6.538384 | — |
| 3 | (73, 71) | 17.27389 | 4.748337 | — |
| 3 | (19, 17) | 16.05317 | 5.969053 | — |
| 3 | (11, 13) | 15.88107 | 6.096706 | — |
| 3 | (47, 49) | 16.73346 | 5.244315 | — |
| 3 | (29, 67) | 16.53346 | 5.044315 | — |
| 3 | (41, 43) | 16.59842 | 5.379362 | — |
| 3 | (23, 61) | 16.39842 | 5.179362 | — |
| 3 | (77, 79) | 17.37639 | 4.601391 | — |
| 4 | (01, 53) | 17.47389 | 4.948337 | — |
| 4 | (37, 89) | 18.19841 | 4.223812 | — |
| 4 | (83, 31) | 18.65912 | 4.918654 | — |
| 5 | (73, 71) | 20 | 4.022222 | 0 (p = 20) |

As shown above, for candidate base pairs (01, 53), (37, 89), (83, 31), and (59, 07), whose product has an odd second-to-last digit, only the iterations for which $t_0+t$ is odd need to be tested. Meanwhile, for candidate base pairs (73, 71), (19, 17), (11, 13), (47, 49), (29, 67), (41, 43), (23, 61), and (77, 79), whose product has an even second-to-last digit, only the iterations for which $t_0+t$ is even need to be tested.

The parity of the second-to-last digit of the modulus n or the parity of the product of the candidate base pair $B_1*B_2$ necessary to evaluate even values of $t_0+t$ as noted above. In this case, if it is also true that the sum $B_1+B_2$ is divisible by 4, then the number of iterations to evaluate may be further cut in half as follows: If n mod 40 equals $(B_1*B_2)$ mod 40, then it is only necessary to evaluate values of $t_0+t$ that are divisible by 4. On the other hand, if n mod 40 does not equal $(B_1*B_2)$ mod 40, then it is only necessary to evaluate values of $t_0+t$ for which $t_0+t+2$ is divisible by 4. An example of this is shown in Table 9 below, which is a modified version of Table 8:

TABLE 9

Example 1: n = 810143 (even)     $t_0 = (2\sqrt{n})/90 - 2 = 18.002 \rightarrow 19$     n mod 40 = 23

$$p = \frac{\pm\sqrt{(B_1 + B_2 + 90(t_0 + t))^2 - 4n} + B_1 - B_2 + 90(t_0 + t)}{180}$$

| t | $(B_1, B_2)$ | | | n modulo $(B_2 + 90p)$ |
|---|---|---|---|---|
| 0 | (01, 53) | UNDEFINED | UNDEFINED | — (non-integer p) |
| 0 | (37, 89) | 11.21669 | 7.205532 | — |
| 0 | (83, 31) | 11.42192 | 8.155858 | — |
| 0 | (59, 07) | UNDEFINED | UNDEFINED | — |
| 1 | (73, 71) | 14.08816 | 5.93406 | — |
| 1 | (11, 13) | 11.62192 | 8.355858 | — |
| 1 | (47, 49) | 13.29547 | 6.682311 | — |
| 1 | (29, 67) | 13.09547 | 6.482311 | — |
| 1 | (77, 79) | 14.23939 | 5.738384 | — |
| 2 | (01, 53) | 14.28816 | 6.13406 | — |
| 2 | (37, 89) | 15.25317 | 5.169053 | — |
| 2 | (83, 31) | 15.68107 | 5.896706 | — |
| 2 | (59, 07) | 15.03939 | 6.538384 | — |
| 3 | (19, 17) | 16.05317 | 5.969053 | — |
| 3 | (41, 43) | 16.59842 | 5.379362 | — |
| 3 | (23, 61) | 16.39842 | 5.179362 | — |
| 4 | (01, 53) | 17.47389 | 4.948337 | — |
| 4 | (37, 89) | 18.19841 | 4.223812 | — |
| 4 | (83, 31) | 18.65912 | 4.918654 | — |
| 5 | (73, 71) | 20 | 4.022222 | 0 (p = 20) |

As shown above, for candidate base pairs (73, 71), (19, 17), (11, 13), (47, 49), (29, 67), (41, 43), (23, 61), and (77, 79), each of whose sum is divisible by 4, it is checked whether $(B_1*B_2)$ mod 40 equals n mod 40=23. If so, as in the case of (73, 71), (11, 13), (47, 49), and (29, 67), then only the iterations for which $t_0+t$ is divisible by 4 are tested for that candidate base pair. If not, as in the case of (19, 17), (41, 43), (23, 61), and (77, 79), then only the iterations for which $t_0+t+2$ is divisible by 4 are tested.

Case 2

Meanwhile, in the case of a candidate base pair $(B_1, B_2)$ for which n mod 20 does not equal $(B_1*B_2)$ mod 20, or equivalently where n mod 20 does not have the same parity as $(B_1*B_2)$ mod 20, it is only necessary to evaluate odd values of $t_0+t$ as noted above. In this case, if it is also true that the sum $B_1+B_2$ is not divisible by 4, then the number of iterations to evaluate may be further cut in half as follows: If n mod 40 equals $((B*B_2)+90B_2)$ mod 40, then it is only necessary to evaluate values of $t_0+t$ for which $t_0+t+1$ is divisible by 4. On the other hand, if n mod 40 does not equal $((B_1*B_2)+90B_2)$ mod 40, then it is only necessary to evaluate values of $t_0+t$ for which $t_0+t+3$ is divisible by 4. An example of this is shown in Table 10 below, which is a further modified version of Table 9:

TABLE 10

Example 1: n = 810143 (even)     $t_0 = (2\sqrt{n})/90 - 2 = 18.002 \rightarrow 19$     n mod 40 = 23

$$p = \frac{\pm\sqrt{(B_1 + B_2 + 90(t_0 + t))^2 - 4n} + B_1 - B_2 + 90(t_0 + t)}{180}$$

| t | $(B_1, B_2)$ | | | n modulo $(B_2 + 90p)$ |
|---|---|---|---|---|
| 0 | (01, 53) | UNDEFINED | UNDEFINED | — (non-integer p) |
| 0 | (37, 89) | 11.21669 | 7.205532 | — |
| 1 | (73, 71) | 14.08816 | 5.93406 | — |
| 1 | (11, 13) | 11.62192 | 8.355858 | — |
| 1 | (47, 49) | 13.29547 | 6.682311 | — |
| 1 | (29, 67) | 13.09547 | 6.482311 | — |
| 1 | (77, 79) | 14.23939 | 5.738384 | — |
| 2 | (83, 31) | 15.68107 | 5.896706 | — |
| 2 | (59, 07) | 15.03939 | 6.538384 | — |
| 3 | (19, 17) | 16.05317 | 5.969053 | — |
| 3 | (41, 43) | 16.59842 | 5.379362 | — |
| 3 | (23, 61) | 16.39842 | 5.179362 | — |
| 5 | (73, 71) | 20 | 4.022222 | 0 (p = 20) |

As shown above, for candidate base pairs (01, 53), (37, 89), (83, 31), and (59, 07), each of whose sum is not divisible by 4, it is checked whether $((B_1*B_2)+901B_2)$ mod 40 equals n mod 40=23. If so, as in the case of (01, 53) and (37, 89), then only the iterations for which $t_0+t+1$ is divisible by 4 are tested for that candidate base pair. If not, as in the case of (83, 31) and (59, 07), then only the iterations for which $t_0+t+3$ is divisible by 4 are tested.

As noted above, it is not necessary for the iterator 150 to check whether n modulo $(B_2+90p)=0$ for values of p that are not positive integers. Along the same lines, it is recognized that the value of p cannot be an integer unless the square root in the above generalized equation for p yields an integer. Thus, by checking whether the value under the square root, $(B_1+B_2+90(t_0+t))^2-4n$, is a perfect square, the iterator 150 may further reduce the amount of time and/or processing resources spent. For example, at each iteration of t, the iterator 150 may, upon calculating p, first check whether $(B_1+B_2+90(t_0+t))^2-4n$ is a perfect square. The iterator 150 may, for example, evaluate whether $B_1+B_2+90(t_0+t))^2-4n$ is divisible by the integer square root of itself. If it is not, the iterator 150 may skip to the next iteration without evaluating p. As in the above case of checking whether p is an integer, there may be a tradeoff between processor resources required to test whether $(B_1+B_2+90(t_0+t))^2-4n$ is a perfect square and processor resources wasted evaluating p.

The private key determiner 160 may determine the private key 210 using the public key exponent e and the factor F2 (or F1) of the modulus n as found by the iterator 150. In the context of the RSA cryptosystem, the private key 210 may include the same modulus n as the public key 220 and a private key exponent d that is different from the public key exponent e. The private key determiner 160 may determine the private key exponent d of the private key 210 such that the product of the private key exponent d and the public key exponent e is congruent to one modulo $\varphi(n)$, where $\varphi(n)=(F1-1)*(F2-1)$, F2 is the factor of the modulus n as found by the iterator 150, and F1 is a value equal to the modulus divided by F2. The private key determiner 160 may, for example, use the extended Euclidean algorithm to determine the private key exponent d.

The decryptor 170 may decrypt the encrypted message 230 using the private key 210 determined by the private key determiner 160. For example, the decryptor 170 may parse an encoded data structure representing the encrypted message 230, e.g. using an ASN.1 parser 172 or other decoder in accordance with PKCS #1 version 2.2, to extract a ciphertext c to be decrypted using the private key 210. The ciphertext c may be the encrypted message 230 itself or it may be an encrypted symmetric key contained in the data structure, with the resulting decrypted symmetric key thereafter used by the decryptor 170 to decrypt the encrypted message 230. In either case, the ciphertext c may further be padded or otherwise encoded according to a known scheme prior to encryption. Given the ciphertext c, the modulus n, and the private key exponent d determined by the private key determiner 160, the decryptor may decrypt the ciphertext c, for example, by determining a plaintext m such that the ciphertext c raised to the power of the private key exponent d is congruent to m modulo n, i.e. $c^d \equiv (m^e)^d \equiv m(\mod n)$, and reverse any padding scheme or other encoding on the plaintext m to arrive at the decrypted message 240.

FIG. 2 shows an example data structure for deriving a set of candidate base pairs for a given modulus n. The data structure shown in FIG. 2 may be stored in the lookup table storage 140 of the apparatus 100. As shown, a unique set of candidate base pairs $(B_1, B_2)$ may be stored in correspondence with each of the twenty-four combinations of interest of the digital root and last digit of the modulus n. The sets of candidate base pairs $(B_1, B_2)$ may depend on the particular set of bases used. For example, in a case where the bases listed in Table 4 will be used, each candidate base pair, e.g. $(B_1, B_2)_1$, $(B_1, B_2)_2$, etc., for a given data entry in FIG. 2 may be a pair of the twenty-four bases listed in Table 4. The set of candidate base pairs for a given entry may represent all of the candidate base pairs that could theoretically yield the digital root and last digit of that entry as described above in relation to Tables 1-5. Thus, referring to the example shown in Table 5 in which the digital root is 8 and the last digit is 3, the entry in the data structure of FIG. 2 may list the twelve candidate base pairs (01, 53), (73, 71), (37, 89), (19, 17), (11, 13), (83, 31), (47, 49), (29, 67), (41, 43), (23, 61), (77, 79), and (59, 07) in correspondence with the entry 8,3. It should be borne in mind that these twelve candidate base pairs may be used as the set of candidate base pairs irrespective of the value of the modulus n, as long as that value has a digital root of 8 and a last digit of 3. In this way, the candidate base pair deriving engine 130 may derive the set of candidate base pairs by referencing a lookup table, such as the data structure shown in FIG. 2, stored in the lookup table storage 140.

Figure 3:
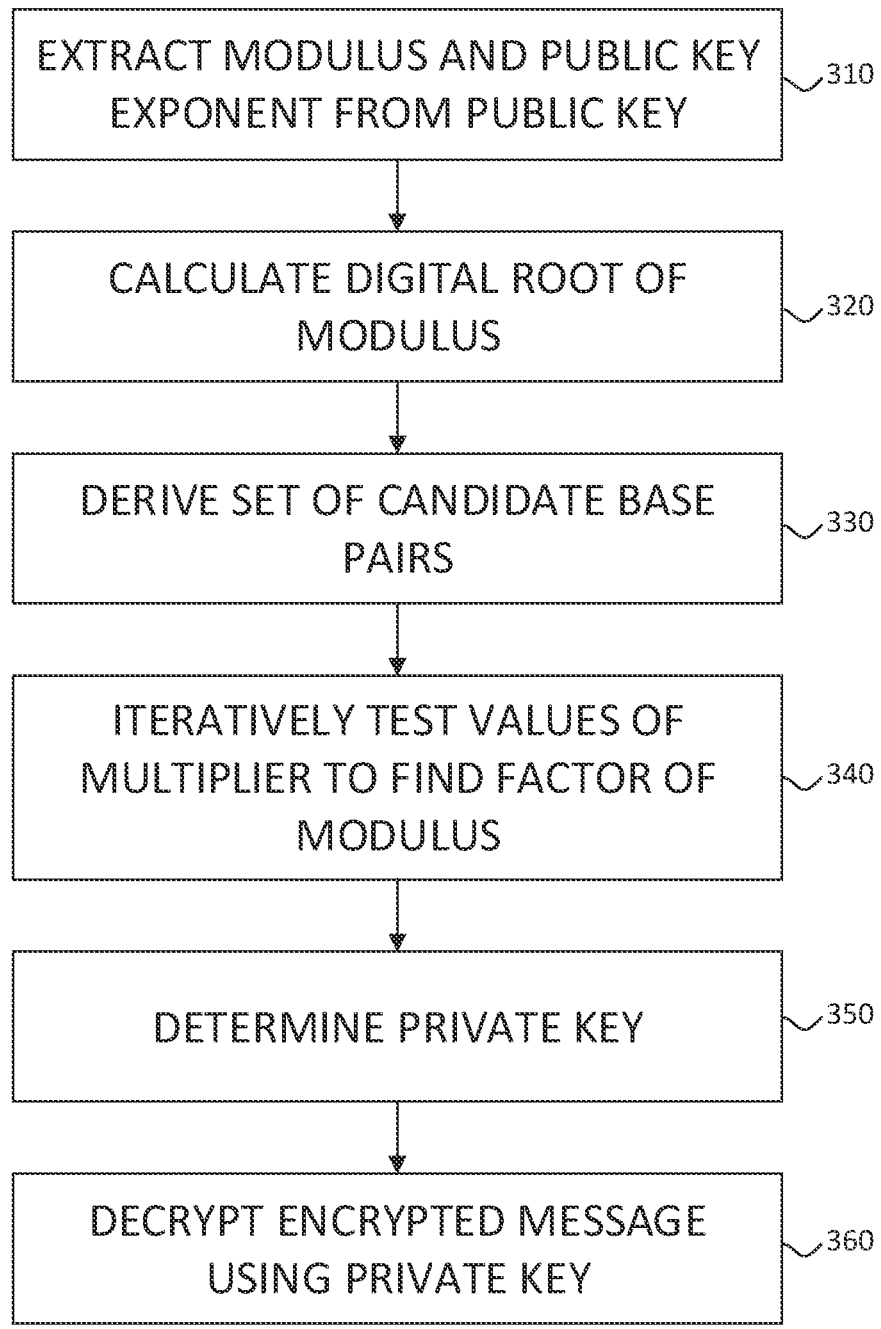
FIG. 3 shows an example operational flow for cracking a private key of an asymmetric cryptosystem according to an embodiment of the present disclosure.

FIG. 3 shows an example operational flow for cracking a private key 210 of an asymmetric cryptosystem 200 according to an embodiment of the present disclosure. Referring by way of example to the apparatus 100 shown in FIG. 1, the operational flow may begin with a step 310 of extracting a modulus n and a public key exponent e from a public key 220, a step 320 of calculating a digital root of the extract modulus n, and a step 330 of deriving a set of candidate base pairs $(B_1, B_2)$ corresponding to the digital root and the last digit of the modulus n. For example, the apparatus 100 may perform these operations using the n/e extractor 110, digital root calculator 120, and candidate base pair deriving engine 130 as described above in relation to FIG. 1, with reference to a lookup table storage 140 storing a data structure such as the example data structure of FIG. 2. The operational flow of FIG. 3 may continue with a step 340 of iteratively testing values of a multiplier until a sum of one of the candidate bases with ninety times the multiplier is a factor of the modulus n. For example, as described above in relation to FIG. 1, the iterator 150 of the apparatus 100 may increment an integer t and test, for each of the candidate base pairs $(B_1, B_2)$, the sum of the second candidate base with a value equal to ninety times a multiplier p, the multiplier p being equal to the expression $$\frac{\pm \sqrt{(B_1 + B_2 + 90(t_{0+}t))^2 - 4n} + B_1 - B_2 + 90(t_{0+}t)}{180},$$

where n is the modulus, $B_1$ is the first candidate base, $B_2$ is the second candidate base, and to is a starting value offset.

With the factors F1, F2 of the modulus n having been found by the iterator 150, the operational flow of FIG. 3 may proceed with a step 350 of determining the private key 210 and, if desired, a step 360 of decrypting an encrypted message 230 using the private key 210. For example, the apparatus 100 may perform these operations using the private key determiner 160 and the decryptor 170 as described above in relation to FIG. 1.

In the above examples, it is described that the bases $B_1$, $B_2$ are typically small numbers. However, the disclosed subject matter is not intended to be so limited. In principle, the bases $B_1$, $B_2$ may be any complete set of numbers from which the prime factors F1, F2, respectively, can be generated by adding multiples of ninety. It should also be noted that adding multiples of ninety may include adding multiples of multiples of ninety. For example, a set of twice as many bases may be used, where each base uniquely defines possible factors of the modulus separated by multiples of 180.

Throughout the above disclosure, the RSA cryptosystem is used by way of example. However, the disclosed subject matter is not necessarily limited to RSA or public/private keys derived from a modulus n and exponents e, d. In particular, the disclosed systems and methods may broadly apply to any cryptosystem that relies on the quantitative difficulty of factoring large semiprimes, or even large numbers other than semiprimes, for security. For example, modifications may be made to the n/e extractor 100, private key determiner 160, and decryptor 170 of the apparatus 100 shown in FIG. 1 in order to use the underlying process with different cryptosystems that define secure entities differently using different mathematical formulations than the public/private keys of the RSA cryptosystem.

Figure 4:
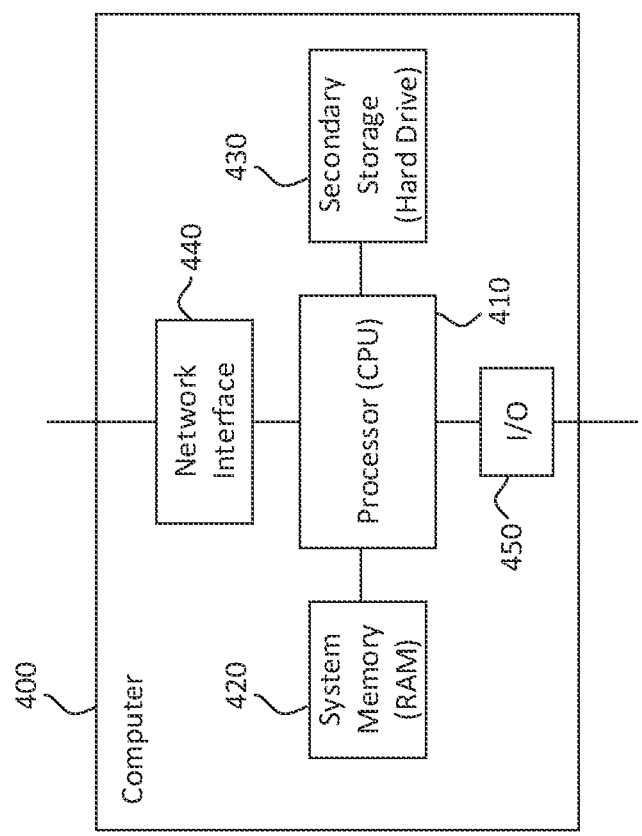
FIG. 4 shows an example of a computer in which the apparatus of FIG. 1, the operational flow of FIG. 3, and/or other embodiments of the disclosed subject matter may be wholly or partly embodied.

FIG. 4 shows an example of a computer 400 in which the apparatus 100 of FIG. 1, the operational flow of FIG. 3, and/or other embodiments of the disclosed subject matter may be wholly or partly embodied. As shown in FIG. 4, the computer 400 may include a processor (e.g. a CPU) 410, a system memory (e.g. RAM) 420, which may be connected by a dedicated memory channel to the processor 410 and temporarily stores results of data processing operations performed by the processor 410, and a hard drive or other secondary storage device 430. The processor 410 may execute one or more computer programs, which may be tangibly embodied along with an operating system in a computer-readable medium, e.g., the secondary storage device 430. The operating system and computer programs may be loaded from the secondary storage device 430 into the system memory 420 to be executed by the processor 410. The computer 400 may further include a network interface 440 for network communication between the computer 400 and external devices (e.g. over the Internet), such as user devices accessing the apparatus 100 and associated GUIs using a mobile application or web browser, as well as key servers, email servers, and/or third party ASN.1 parsers to be used by the n/e extractor 110 and/or decryptor 170 of the apparatus 100. Local user interaction with the computer 400 may be via one or more I/O devices 450, such as a display, mouse, keyboard, etc.

The computer programs may comprise program instructions which, when executed by the processor 410, cause the processor 410 to perform operations in accordance with the various embodiments of the disclosed subject matter. For example, a program that is installed in the computer 400 may cause the computer 400 to function as an apparatus such as the apparatus 100 of FIG. 1, e.g., causing the computer 400 to function as some or all of the sections, components, elements, databases, storages, engines, extractors, calculators, determiners, iterators, decryptors, parsers, etc. of the apparatus 100 of FIG. 1 (e.g., the n/e extractor 110, the digital root calculator 120, etc.). A program that is installed in the computer 400 may also cause the computer 400 to perform an operational flow such as that shown in FIG. 3 or a portion thereof, e.g., causing the computer 400 to perform one or more of the steps of FIG. 3 (e.g., "extract modulus and public key component from public key" 310, "calculate digital root of modulus" 320, etc.).

The above-mentioned computer programs may be provided to the secondary storage 430 by or otherwise reside on an external computer-readable medium such as a DVD-ROM, an optical recording medium such as a CD or Blu-ray Disk, a magneto-optic recording medium such as a magneto-optical (MO) disc, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer 400 via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of cracking a private key of an asymmetric cryptosystem, the method comprising:
    extracting a modulus and a public key exponent from a public key;
    performing modulo division on the modulus;
    deriving a set of candidate base pairs corresponding to a result of the modulo division, each of the candidate base pairs including a first candidate base and a second candidate base;
    iteratively testing values of a multiplier until a sum of one of the candidate bases with a multiple of the multiplier is a factor of the modulus; and
    determining the private key using the public key exponent and the factor of the modulus.

2. The method of claim 1, wherein said extracting includes parsing an encoded data structure containing the public key.

3. The method of claim 2, wherein said parsing is performed using an ASN.1 parser.

4. The method of claim 1, wherein said deriving includes referencing one or more lookup tables associating possible results of the modulo division with possible candidate base pairs.

5. The method of claim 1, wherein said iteratively testing includes incrementing an integer t and testing, for one or more of the candidate base pairs, the sum of the second candidate base with the multiple of the multiplier p, the multiplier p being an expression that relates the modulus n, the first candidate base $B_1$, and the second candidate base $B_2$.

6. The method of claim 5, wherein the expression relates the modulus n, the first candidate base $B_1$, the second candidate base $B_2$, and a starting value offset $t_0$.

7. The method of claim 6, wherein the starting value offset to is a function of the modulus.

8. The method of claim 1, wherein said iteratively testing includes checking whether the multiplier is an integer.

9. The method of claim 1, wherein said iteratively testing includes checking whether an expression derived from the multiplier is a perfect square.

10. The method of claim 1, wherein said iteratively testing includes, for each of the candidate base pairs, comparing the modulus n to the product of the candidate base pair $B_1*B_2$.

11. The method of claim 1, wherein said determining includes determining a private key exponent of the private key such that the product of the private key exponent and the public key exponent is congruent to one modulo p, where p is equal to (F1−1)*(F2−1), F2 is the factor of the modulus, and F1 is a value equal to the modulus divided by F2.

12. The method of claim 1, further comprising decrypting an encrypted message using the private key.

13. The method of claim 12, wherein said decrypting includes decrypting an encrypted symmetric key using the private key and decrypting the message using the symmetric key.

14. The method of claim 12, wherein said decrypting includes parsing an encoded data structure including the encrypted message.

15. The method of claim 14, wherein said parsing is performed using an ASN.1 parser.

16. The method of claim 12, wherein said decrypting includes determining a plaintext m such that a ciphertext c of the encrypted message raised to the power of the private key exponent is congruent to m modulo n where n is the modulus.

17. A non-transitory program storage medium on which are stored instructions executable by a processor or programmable circuit to perform operations for cracking a private key of an asymmetric cryptosystem, the operations comprising:
    extracting a modulus and a public key exponent from a public key;
    performing modulo division on the modulus;
    deriving a set of candidate base pairs corresponding to a result of the modulo division, each of the candidate base pairs including a first candidate base and a second candidate base;
    iteratively testing values of a multiplier until a sum of one of the candidate bases with a multiple of the multiplier is a factor of the modulus; and
    determining the private key using the public key exponent and the factor of the modulus.

18. The non-transitory program storage medium of claim 17, wherein the operations further comprise decrypting an encrypted message using the private key.

19. A system for cracking a private key of an asymmetric cryptosystem, the system comprising:
    an n/e extractor for extracting a modulus and a public key exponent from a public key;
    a calculator for performing modulo division on the modulus;
    a candidate base pair deriving engine for deriving a set of candidate base pairs corresponding to a result of the modulo division, each of the candidate base pairs including a first candidate base and a second candidate base;
    an iterator for iteratively testing values of a multiplier until a sum of one of the candidate bases with a multiple of the multiplier is a factor of the modulus; and
    a private key determiner for determining the private key using the public key exponent and the factor of the modulus.

20. The system of claim 19, further comprising a decryptor for decrypting an encrypted message using the private key.

* * * * *